(12) United States Patent
Umebayashi

(10) Patent No.: US 6,515,765 B1
(45) Date of Patent: Feb. 4, 2003

(54) IMAGE DATA MANAGEMENT SYSTEM AND METHOD THEREOF

(75) Inventor: Akito Umebayashi, Shiga-ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/327,416

(22) Filed: Jun. 8, 1999

(30) Foreign Application Priority Data

Jun. 15, 1998 (JP) .......................................... 10-166983

(51) Int. Cl.$^7$ .............................................. G06K 15/00
(52) U.S. Cl. .......................................... 358/1.9; 358/1.1
(58) Field of Search ........................... 345/334; 358/1.9, 358/1.1, 400, 403, 407; 379/100.06, 100.09, 100.17

(56) References Cited

U.S. PATENT DOCUMENTS

| | | | |
|---|---|---|---|
| 5,039,847 A | 8/1991 | Morii et al. | 235/379 |
| 5,579,471 A | 11/1996 | Barber et al. | 382/209 |
| 5,706,457 A | 1/1998 | Dwyer et al. | 395/309 |
| 5,751,949 A | 5/1998 | Thomson et al. | 395/187.01 |
| 5,761,655 A | 6/1998 | Hoffman | 707/4 |
| 5,818,446 A | * 10/1998 | Bertram | 345/334 |

FOREIGN PATENT DOCUMENTS

EP 0 749 064 A1 12/1996 .............. G06F/3/12

OTHER PUBLICATIONS

2478 World Patent Information—13(1991) No. 3, Headington Hill Hall, Oxford GB—Image Handling at the European Patent Office: BACON and First Page.–J. –P. Dintzner, Director, ISDAS and J. Van Thielen, Director, BACON Project Team, European Patent Office, DG1, Rijswijk, Netherlands –Cover, p. 153 and 154.

* cited by examiner

*Primary Examiner*—Jerome Grant, II
(74) *Attorney, Agent, or Firm*—McDermott, Will & Emery

(57) ABSTRACT

The present invention relates to the image data management means performing the registration and fetching (printing) of an image data and the method thereof. By the image data management means the image data is registered in a storage means with adding a file name based on a registration number specifying said image data and then the registration number and attribute information about the image data corresponding to it are registered and controlled in an attribute information table. The image data management means, when a specific registration number is informed, fetches the image data corresponding to said registration number out of a storage means and instructs an image data output means to print the fetched image data. The publication means publishes a list view based on the attribute information registered in the attribute information table through a network. The browser means transmits the print request regarding the image data corresponding to at least one of the list view published by the publication means toward the publication means together with the registration number of the image data. The publication means the registration number of the print-request object toward the image data management means. According to this arrangement, it is possible to shorten the print processing of the image data.

23 Claims, 18 Drawing Sheets

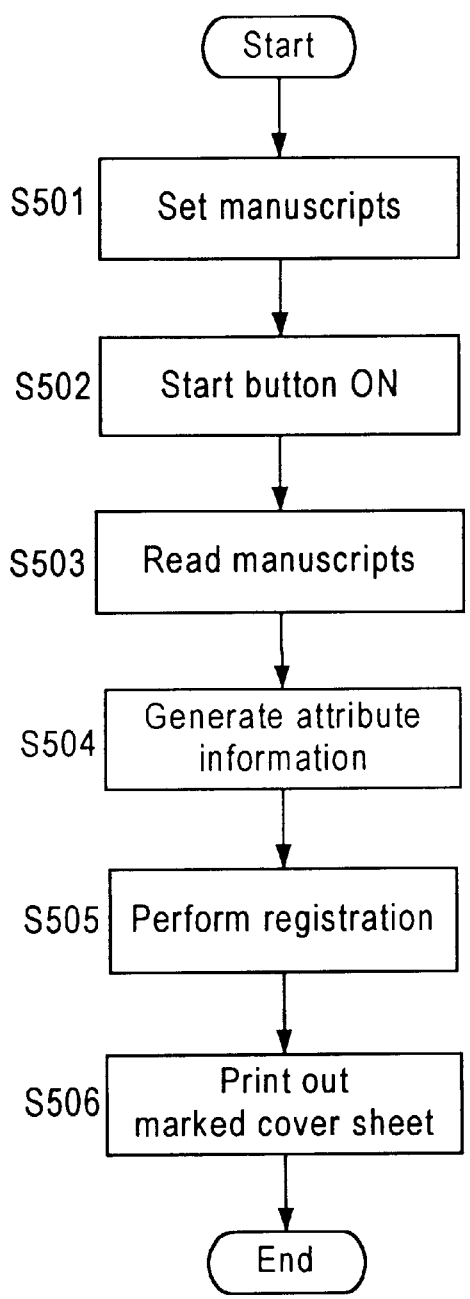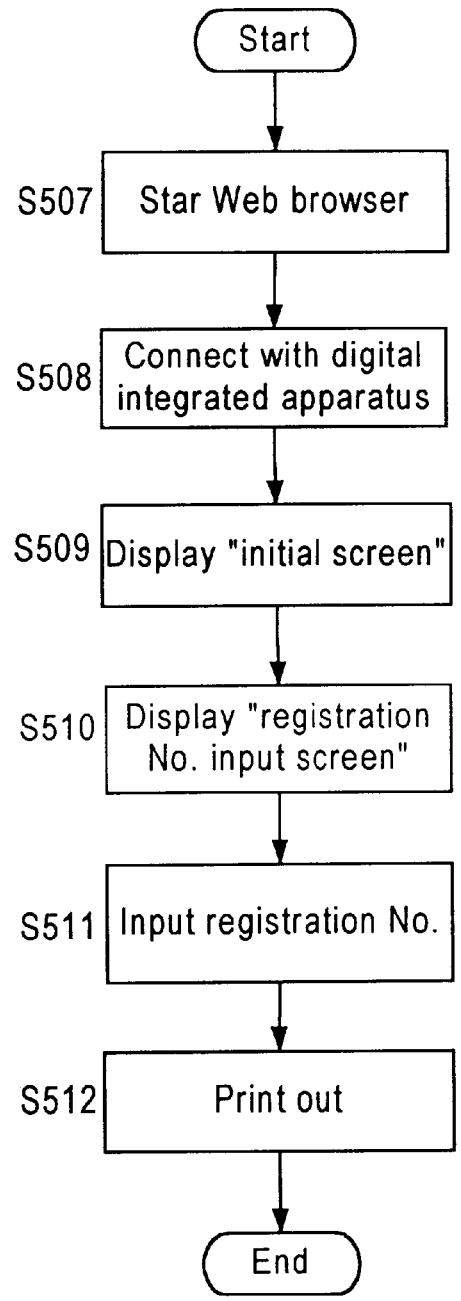
Fig. 10(a)
Fig. 10(b)

Registration Number Mark
Marked cover sheet
Registration Number

IMAGE DATA MANAGEMENT SYSTEM AND METHOD THEREOF

BACKGROUND OF THE INVENTION

1. Field of the Invention

This invention relates to an image data management system which performs a registration and a fetch (printing) of image data and a method thereof.

2. Description of the Prior Art

FIG. 21 is an illustrated diagram showing a typical image data management system of conventional inventions, which constructions will be explained hereinafter along with operations thereof.

First, when a manuscript is placed on a scanner 101, an image data obtaining program 104, which works in a personal computer 103, starts and issues a request to read manuscript. The image data obtaining program 104 sends an operational instruction to a scanner 101 through a SCSI cable 102. The scanner 101 drives an image sensor to read an image data at every line, at every fixed block or at every page. An image data, which is generated according to the above read processing is transferred to the image data obtaining program 104 through a SCSI cable 102, and then stored in a hard disc of the personal computer 103. If there are a plural manuscript placed on the scanner 101, an auto document feeder (ADF) provided with the scanner 101 feeds each recording paper automatically so that the next manuscript may be read in order.

Next, the image data stored in a hard disc of the personal computer 103 is transmitted to a server unit 200 through a main network 400 together with attribute information such as the image data size, the date and time of reading etc. In the server unit 200, while the received image data is stored to the hard disc, the attribute information added with pointer information of the registered location is registered on the database 201.

As described above, the server unit 200 controls centrally the image data generated by the personal computer 101, therefore the image data can be displayed by a display program 301 (or operating system) of another personal computer 300 connected with the main network 400. And by using the printing function of the display program 301, the image data can be printed out by a printer 302 connected with the personal computer 101 or an arbitrary printer (not shown) connected with the main network 400.

However, in case that an image data is printed out by the above conventional image data management system, the image data must be transferred from the server unit 200 to the personal computer 300 in the first step. And unless the image data transferred from the server unit 200 is displayed once on a screen by the display program 301 of the personal computer 300, the data cannot be printed out. It is a general processing in the conventional system Namely, in the conventional image data management system even if the image management system works only in the purpose of printing of image data, the above-mentioned processing is required. Therefore there is a problem that it takes much time to perform the print processing

SUMMARY OF THE INVENTION

This invention is proposed to resolve the above conventional problem, and the object is to provide with an image data management system and method in order to shorten the time of the print processing.

To achieve the above object, the present invention adopts the following means on the assumption that this invention relates to an image data management system composed of a digital integrated apparatus 10 and a browser unit 30 connected with each other through a network.

An image data management means 8 of the digital integrated apparatus 10 registers an image data inputted from an image data input means 2a into a storage means 9 with adding a file name based on a registration number specifying said image data, and then registers and controls the registration sequence number and attribute information of the image data corresponding to it into an attribute information table 9a. And when a specific registration number is informed, said image data management means 8 fetches the image data corresponding to said registration number and instructs an image data output means 1a to print out the fetched image data At that time, a publication means 6 publishes a list view based on the attribute information stored in the attribute information table 9a through a network A browser means 33 of the browser unit 30 transmits the print-request for an image data corresponding to at least one of the list view published by the publication means 6 toward the publication means 6 together with the registration number. The publication means received the print-request notifies the registration number of the print-request object to the image data management means 8.

According to the above procedure, it is possible to print out the image data stored in the storage means 9 of the digital integrated apparatus 10 without transfer and display of the image data, therefore it is possible to shorten the time of the print processing for image data.

And in order that the user may easily find out the image data to be printed from the list view, the present invention is so constructed that a thumbnail image, for example, may be display in a list view.

If the security print as below is used, the printed matters can not be read by other peoples. And it is effective in case that the image data management system is available for many users. Namely, at receiving the security-print-request from the browser means 33, an unique receipt number is issued for every image data of the security-print-request object and the issued receipt number is transmitted to the browser means 33. After that, if the receipt number is inputted from an operation means 4, the image data corresponding to the receipt number is to be printed out. According to this arrangement, the timing of printing out image data can be controled.

The image data management system of the present invention can be applied to the construction that a plural digital integrated apparatus is connected with each other through a network According to this construction, when an specified digital integrated apparatus 10 of which the image data output means 1a is busy receives the print-request from the browser unit 33, the image data of the print-request object registered in the storage means 9 of the specified digital integrated apparatus is to be printed by the image data output means of other specified digital integrated apparatus (as not shown) designated by the browser means 33, therefore the print processing may not be discontinued even if the image data output means la is busy.

BRIEF DESCRIPTION OF THE DRAWINGS

FIG. 10 shows a flowchart in the fourth embodiment of the present invention.

DESCRIPTION OF THE PREFERRED EMBODIMENTS

Figure 13:
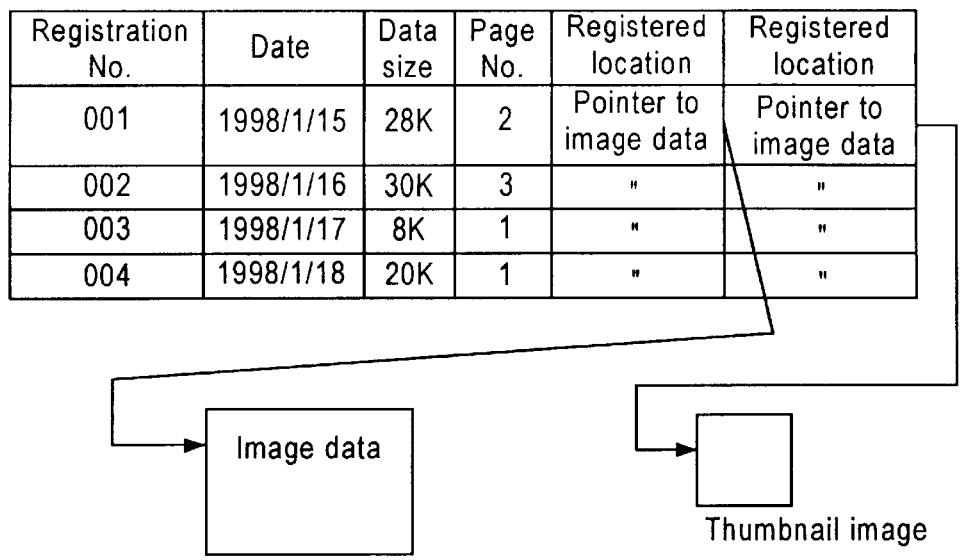
FIG. 13 shows an example of a configuration of the attribute information in the third embodiment of the present invention.
Figure 19:
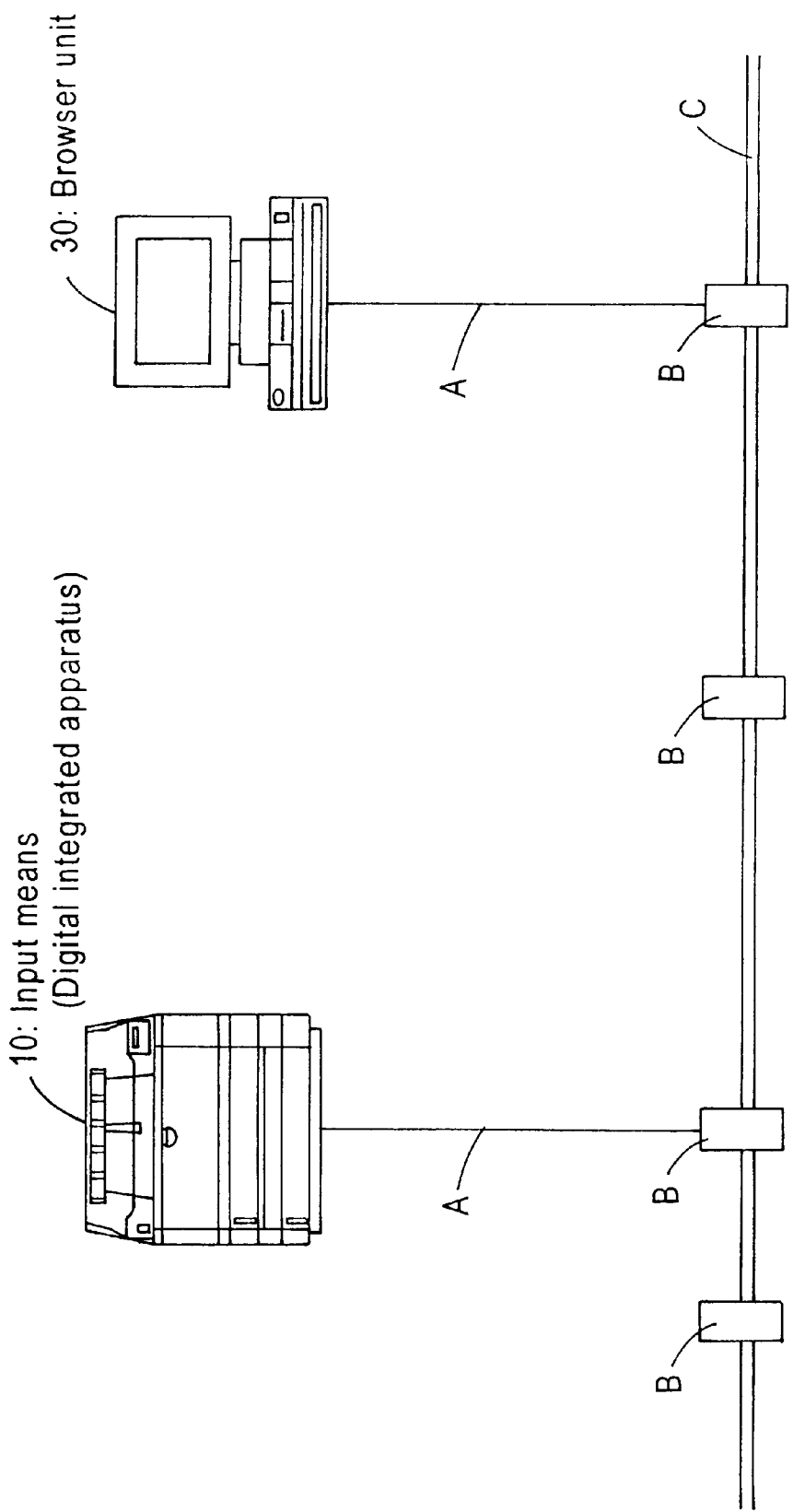
FIG. 19 shows a diagram of the network connection in the present invention.
Figure 20:
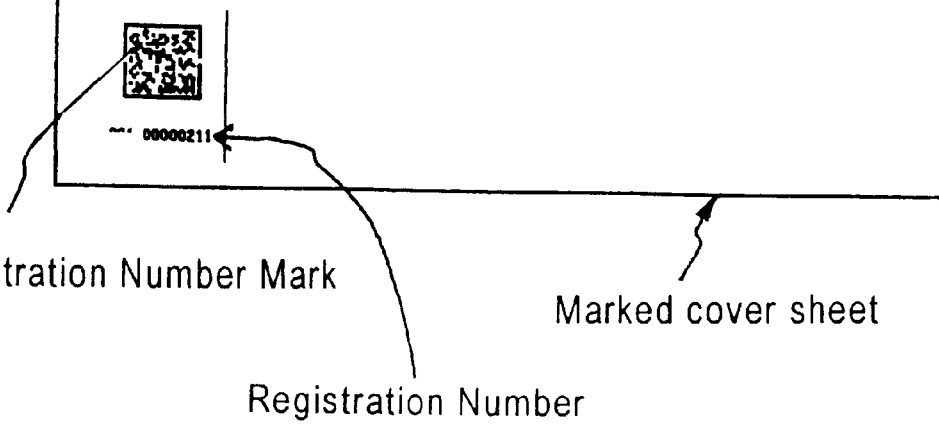
FIG. 20 shows an illustrated diagram of a cover sheet attached with a mark.
Figure 21:
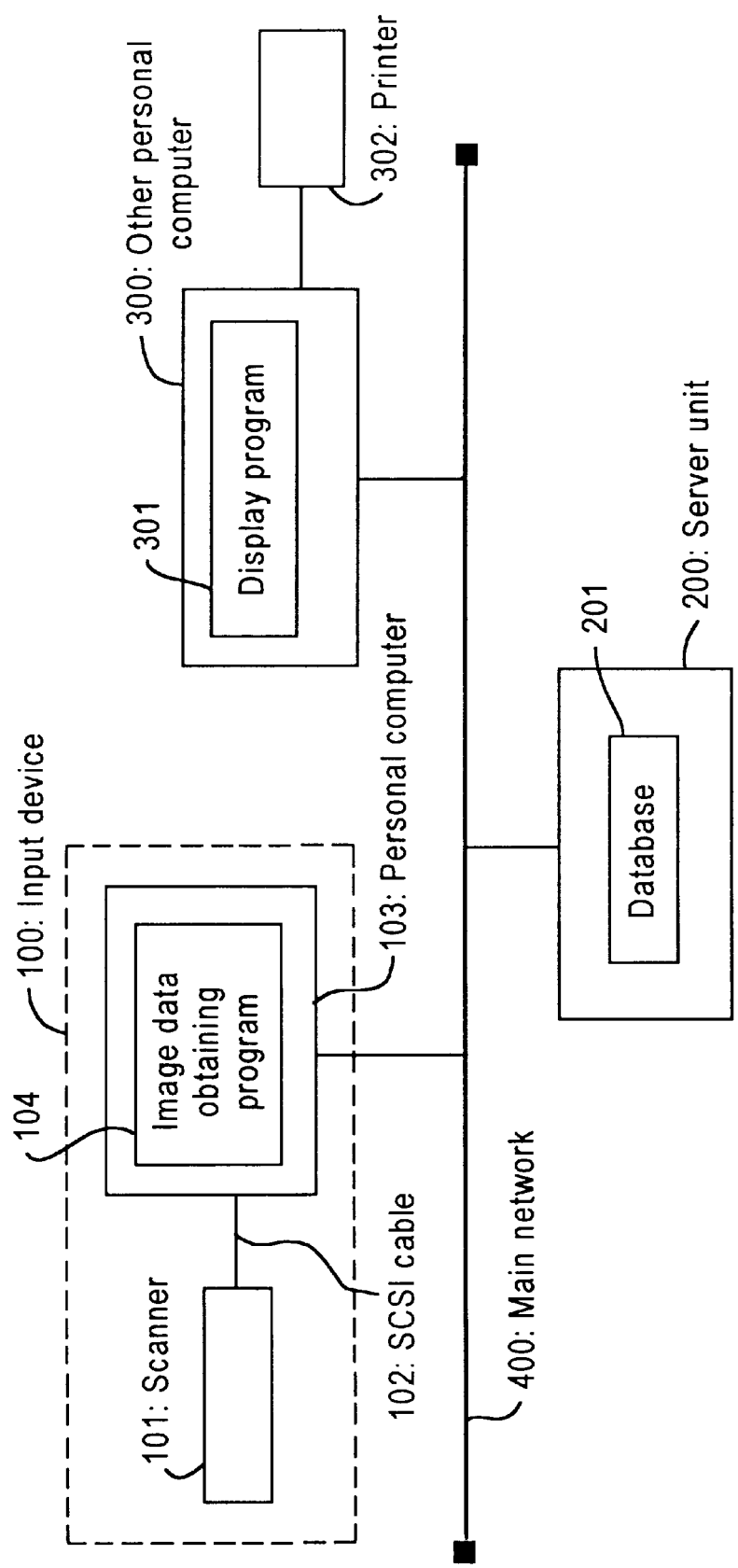
FIG. 21 shows an illustrated diagram of a conventional image data management system.

FIG. 19 is a diagram of a network construction of the image data management system in the present invention, wherein an digital integrated apparatus 10 and a browser unit 30 such as a personal computer, etc. are connected with a main cable C such as Ethernet through a transmission line A and a connector B such as a transceiver. The digital integrated apparatus 10 is an apparatus which main body is a digital copying machine and comprises a digital image data apparatuses such as a fax machine, a printer and so on, accordingly it came to be true that only a compact space is necessary for setting the digital integrated apparatus. In the digital integrated apparatus, a user can instruct various kind of operations by using an operation panel 4b composing of a start button 4c, a touch panel 4d, a ten key 4e and so on as shown in FIG. 13. The preferred embodiments of the invention will be explained according to the drawings hereinafter.

Embodiment 1

Figure 1:
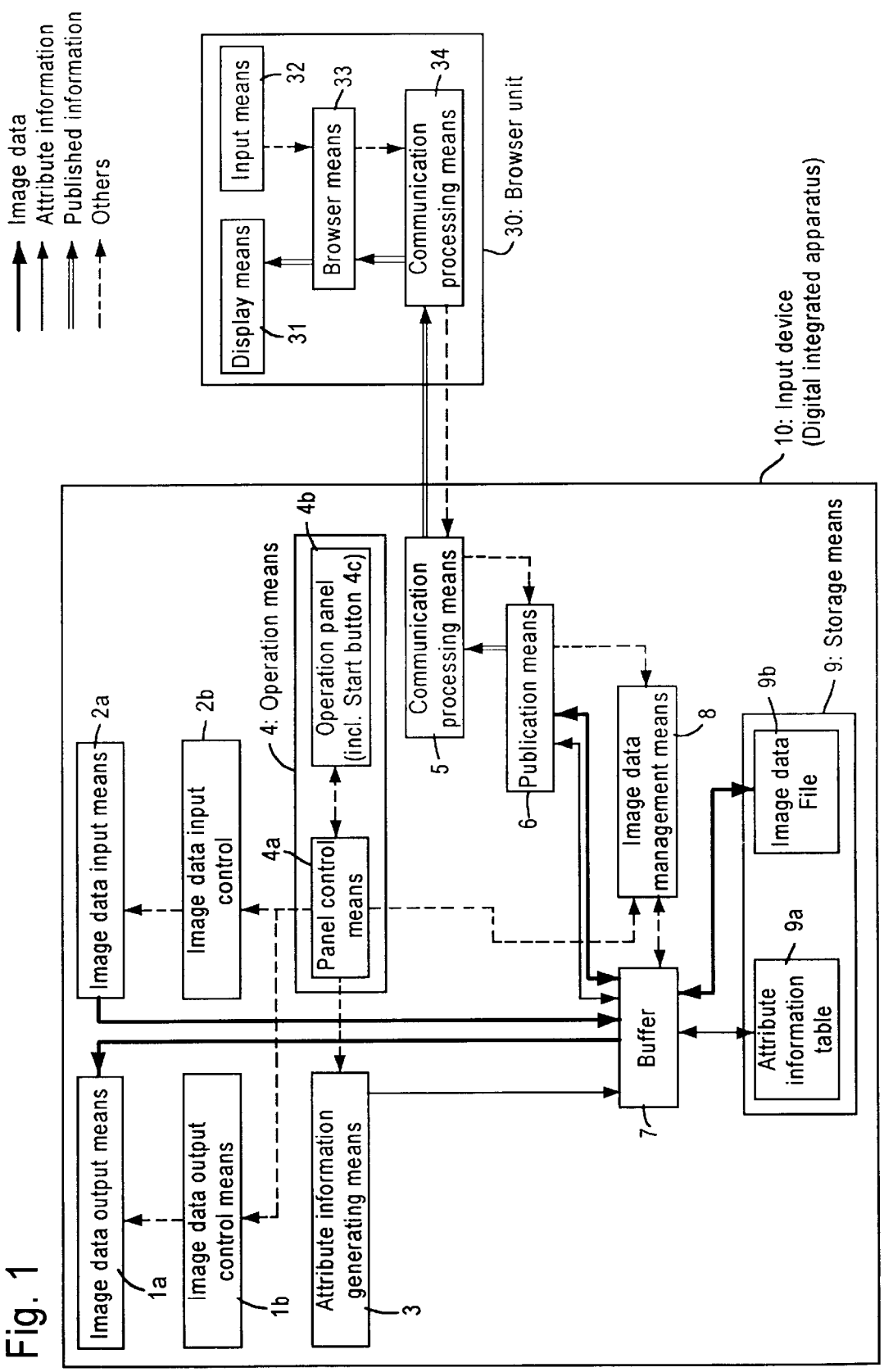
FIG. 1 shows a schematic functional block diagram in the first embodiment of the present invention.

FIG. 1 is a schematic functional block diagram of an image data management system in this embodiment of the present invention. FIG. 6 is a flowchart showing the operation procedures. The construction of this embodiment will be explained according to the operation procedures.

<Registration Processing>

Figure 6A:
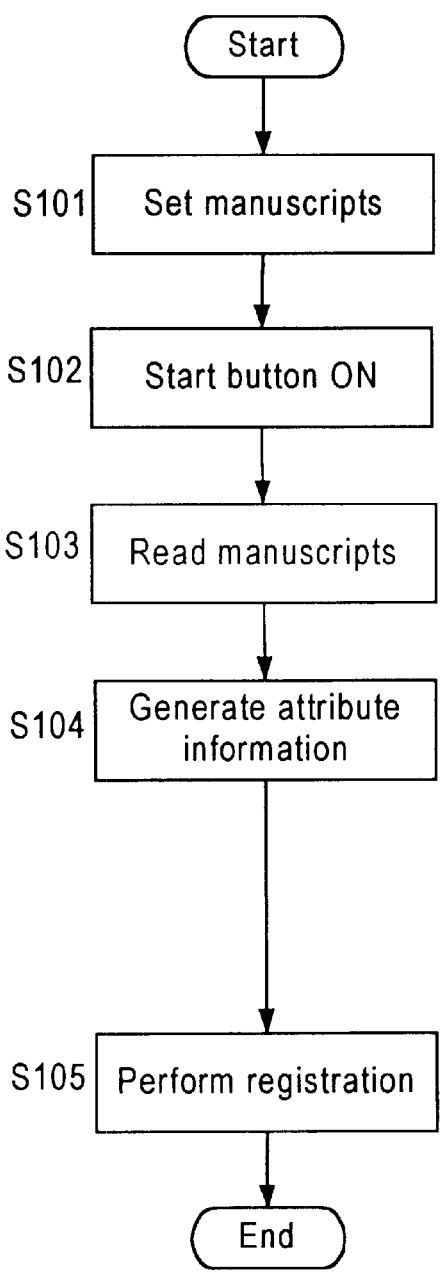
FIG. 6 shows a flowchart in the first embodiment of the present invention

First, an user places manuscripts to be registered on an image data input means 2a such as an image scanner (FIG. 6(a), Step S101).

And the user presses a start button 4c included in an operation panel 4b, of which operation information is informed to a panel control means 4a The panel control means 4a requests to read manuscripts to an image data input control means 2b which controls to drive the image data input means 2a along with notifying the registration request of the image data to an attribute information generating means 3 and an image data management means 8 (FIG. 6(a), Step S102).

The image data input control means 2b received the above requests instructs the image data input means 2a to read manuscripts. The image data input means thus instructed reads the manuscripts and stores digitized image data in a buffer 7. On the other hand, the attribute information generating means 3 received the above registration request issues a registration number such as composed of three digits numerals, and generates the attribute information of the image data (that is, the information composed of "Registered sequence number", "Date of registration", "Image data size", "Image data format type", and etc.), which are stored in the buffer 7 (FIG. 6(a), Step S103).

The registration number is issued newly by the attribute information generating means 3 when the image data is generated, and a peculiar (unique) number for the image data generated in the digital integrated apparatus 10.

Figure 11:
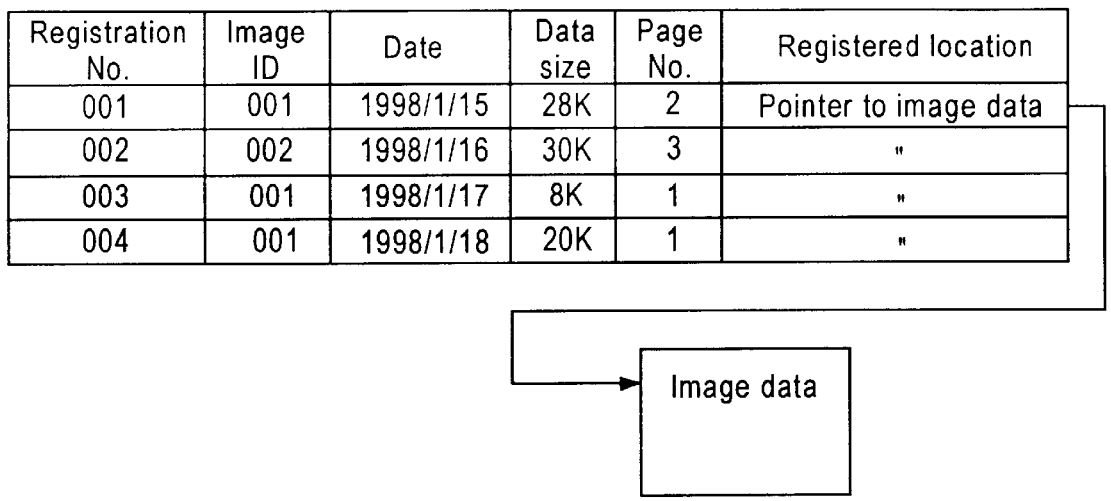
FIG. 11 shows an example of a configuration of the attribute information in the first embodiment of the present invention.

The image data management means 8, which receives the registration request from the panel control means 4a, registers the image data stored in the buffer 7 as the image data file 9b in a storage means 9 such as a magnetic disc, an optical disc, a photo magnetic disc and so on. On the other hand, the information which indicates a registered location of the image data. that is, pointer information such as a pass name of the image data file 9b, is added to the attribute information stored in the buffer 7, which is registered in the attribute information table 9a on the storage means 9 (see FIG. 11). Therefore the registration processing is completed (FIG. 6(a), Step S104→S105).

As described above, in the image management system of this embodiment, by only an operation of pressing down a start button 4c provided with the digital integrated apparatus, it is possible to register the image data thus generated in the storage means 9.

And a publication means 6 which is a built-in WWW server, for example, works in the digital integrated apparatus of this embodiment. It is arranged that the information published by the publication means 6 can be overlooked by a browser means 33 worked on a browser unit 30 such as a WEB browser, for example. The WWW (World Wide Web) means a system that by using the Internet as a communication means the various information published on Network Web) can be read by every one, which is explained in RFC Request For Comments) 2068, 1945, and etc.

<Print Processing>

Figure 6B:
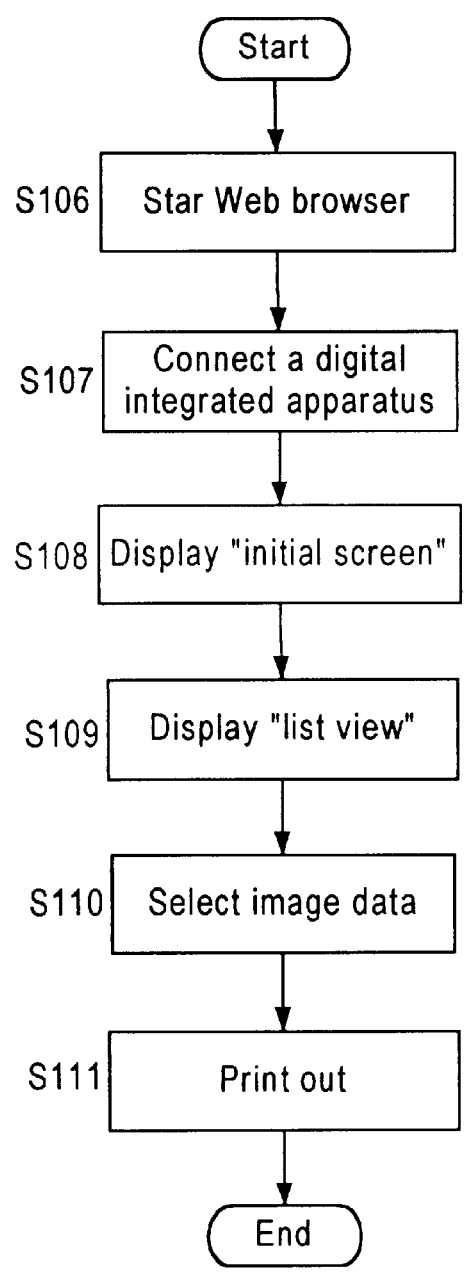

First, the user starts the browser means 33 in the browser unit 30, and executes the processing of connecting to the digital integrated apparatus 10 FIG. 6(b), Step S106→S107).

Figure 18:
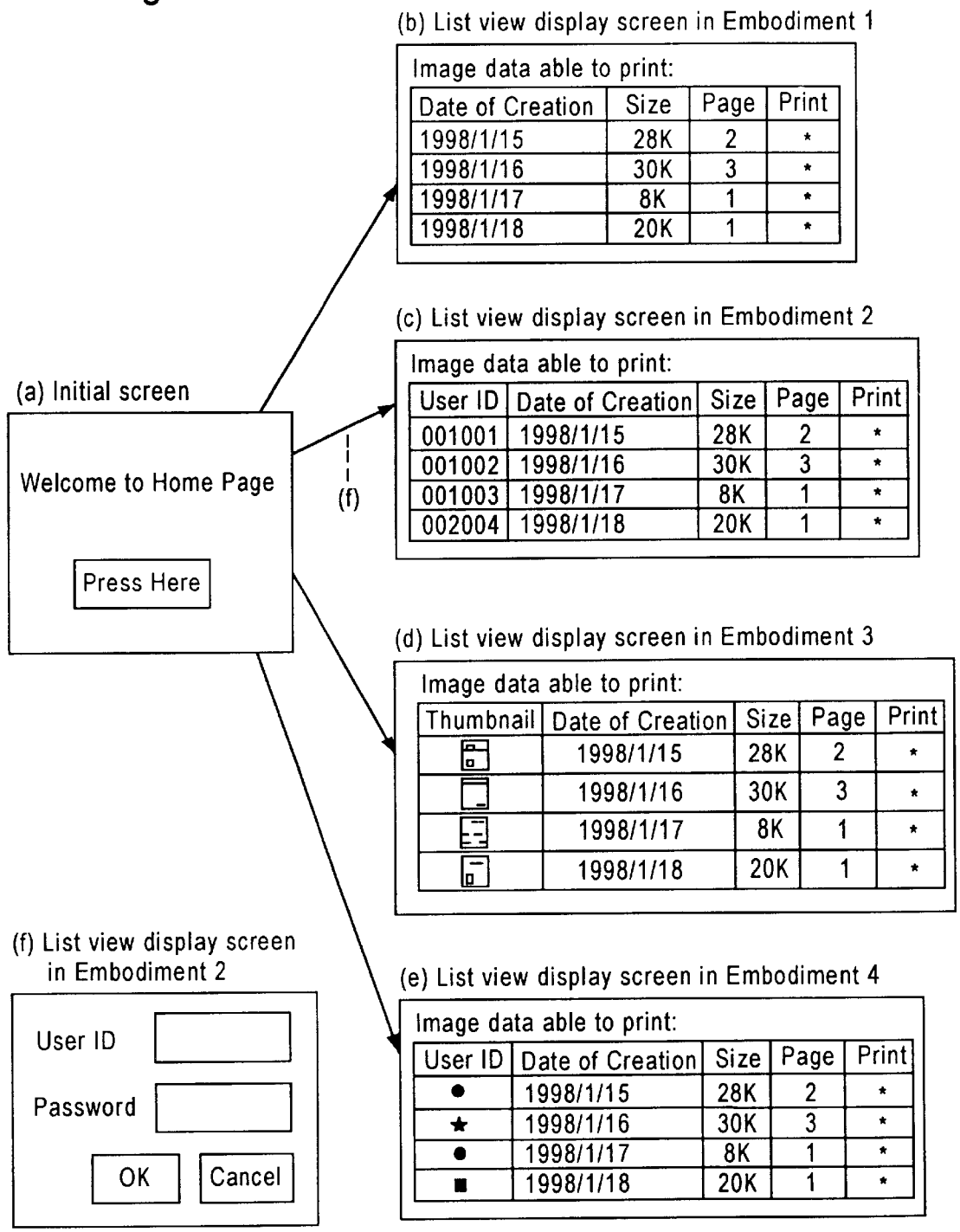
FIG. 18 shows an illustrated diagram of a display screen of a browser unit.

When the connecting is successful, the publication means 6 worked in the digital integrated apparatus transmits a screen data for the initial display to the browser means 33, and the browser means 33 displays the transmitted screen data on the display means 31 as the screen image shown in FIG. 18(a) (FIG. 6(b), Step S108).

Next, when the user clicks a "Press Here" button shown in FIG. 18(a), the browser means 33 transmits a request to obtain a list view forward the publication means 6. After the publication means 6, which receives the request to obtain a list view, creates a list view according to the information registered in the attribute information table 9a, the list view information is transmitted to the browser means 33. The browser means 33 displays the list view information on the display means 31 as the screen image shown in FIG. 18(b). The data, which is transferred from the digital integrated apparatus 10 to the browser means 33 in order to perform said display, is a text data, of which the transferable data size is small enough to be disregarded comparing with that of the image data As the mechanism that the publication means 6 creates a list view automatically is well-known according to RFC 2068, 1945 and etc., the explanation is omitted in this embodiment (FIG. 6(b), Step S109).

According to the above process, the user can read the list view of the image data registered in the the digital integrated apparatus 10 by using the browser unit 30.

In this embodiment of the present invention, it is arranged that the printing of the image data is performed by the digital integrated apparatus 10. Namely, the user presumes the image data according to the information such as "time and date of creation") "sheet number" and so on which are shown in the list view, and selects the image data to be printed by clicking a "print" column, for example (FIG. 6(b), Step S110).

According to the above selection, the browser means 33 transmits a print-request to the publication means 6 together with the registration number of the selected image data, the publication means 6 receiving the print-request instructs the image data management means 8 to print the image data together with the received registration number. The image data management means 8 thus instructed makes refer to the attribute information table 9a in the storage means 9 and fetches the image data file 9b corresponding to the registration number. After that, the fetched image data is transmitted to the image data output means 1a such as a printer and so on. The transmitted image data is printed out on recording papers by the image data output means 1a, therefore the print processing is completed (FIG. 6(b), Step S111).

As described above, it is possible for the image data management system to print the image data registered in the storage means 9 of the digital integrated apparatus 10 without the transmission and screen display of the image data Embodiment 2

Figure 2:
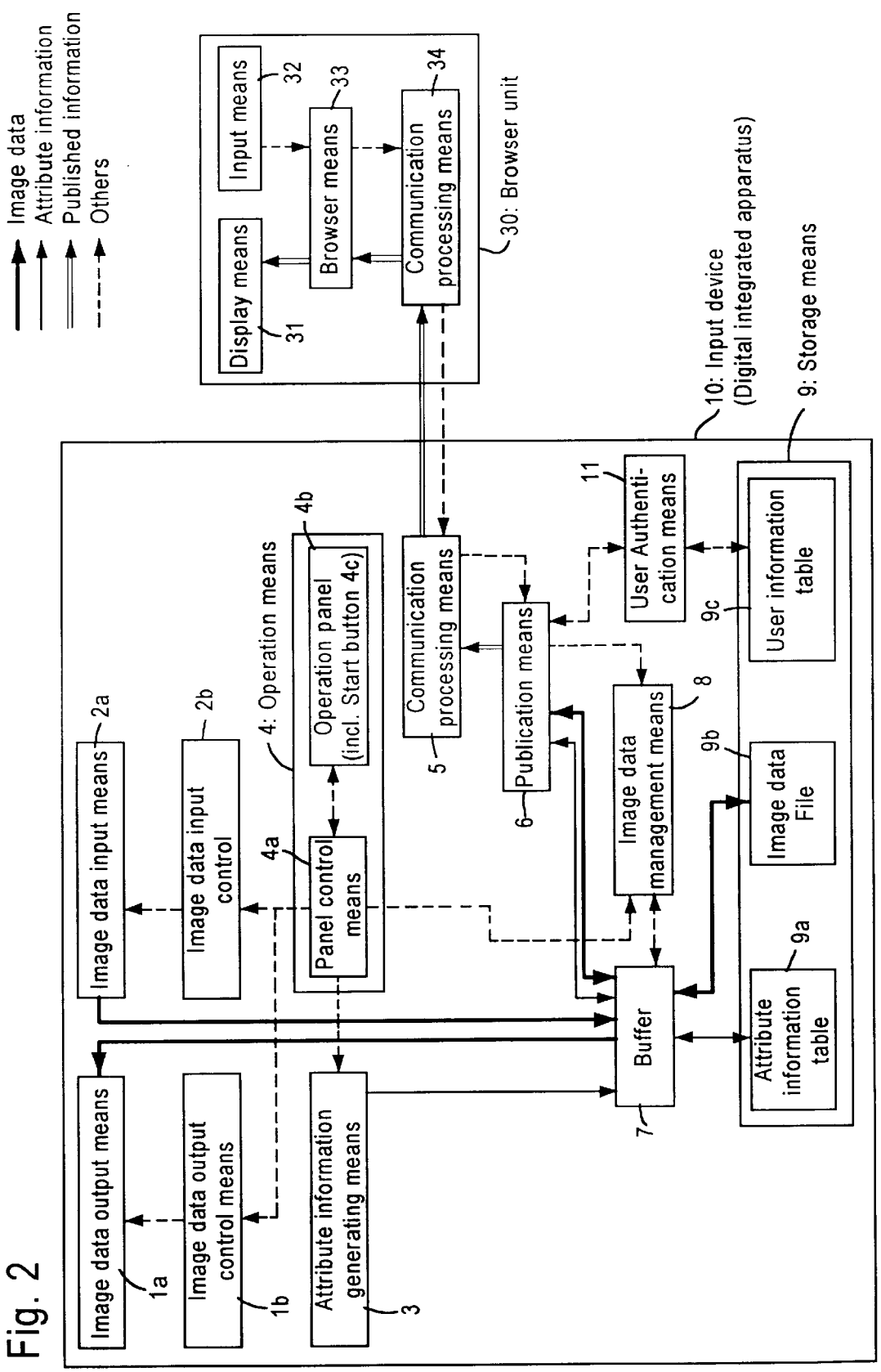
FIG. 2 shows a schematic functional block diagram in the second embodiment of the present invention.
Figure 7A:
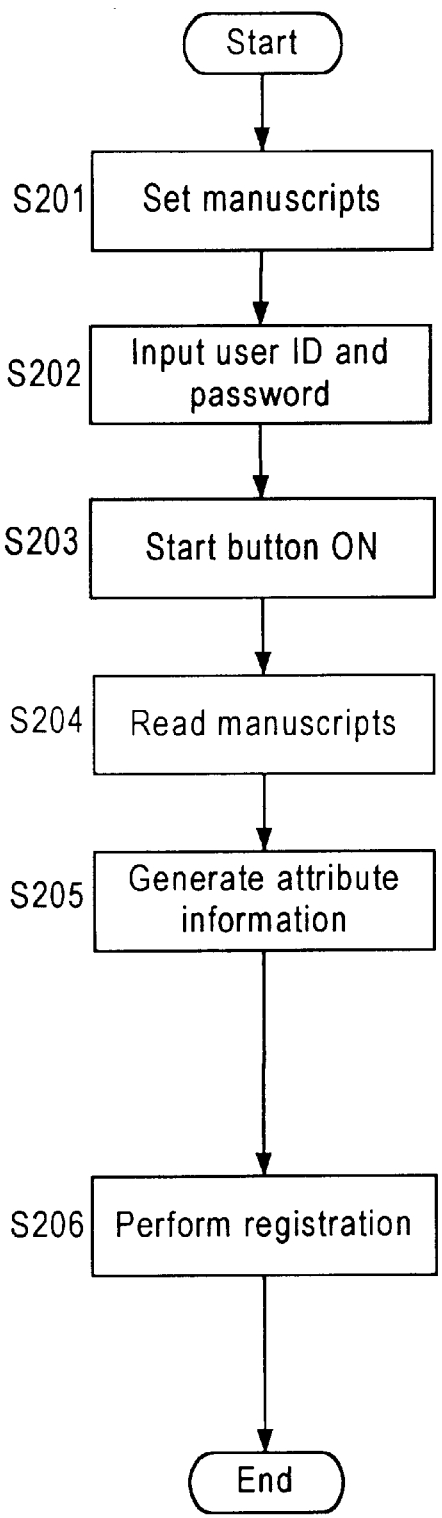
FIG. 7 shows a flowchart in the second embodiment of the present invention.
Figure 7B:
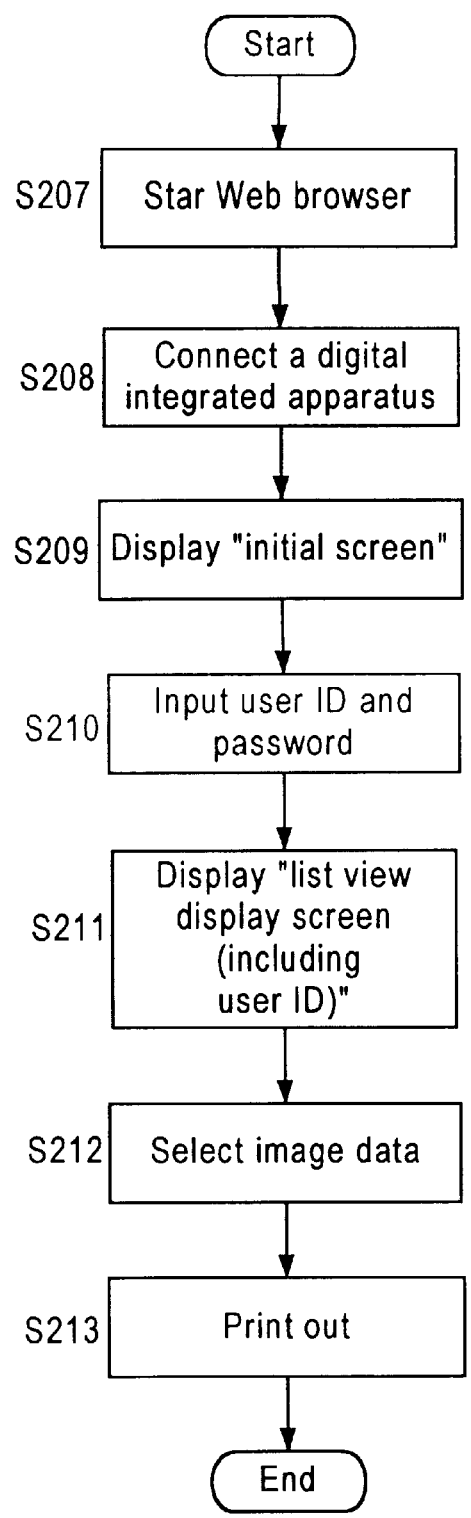

In addition to the construction of the first embodiment, it is constituted in this embodiment that the user authentication is performed in the digital integrated apparatus 10. The points different from the first embodiment will be explained according to FIGS. 2 and 7.

<Registration Processing>

Figure 16A:
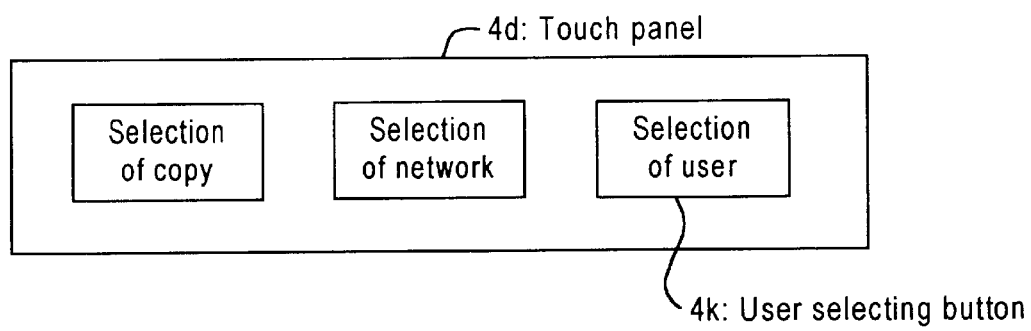
FIG. 16 shows an illustrated diagram of a touch panel in the second embodiment of the present invention.
Figure 16B:
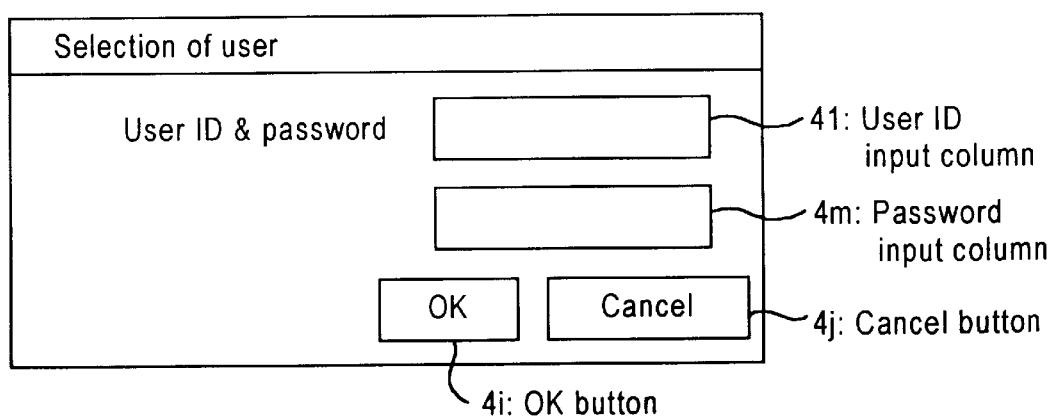

In this embodiment, after manuscripts to be registered arc placed on the image data input means 2a, the user sets up the user setting before pressing the start button 4c. Namely, when the user presses down "user setting" button 4k shown in the initial screen on the touch panel 4d (see FIG. 16(a)), the user setting screen shown in FIG. 16(b) is displayed. On the user setting screen, the user inputs his own user ID and password, which are allocated to himself in advance, by using a ten key 4e (FIG. 7(a), Step S201 to S202).

His own user ID and password allocated in advance has been set in the user information table 9c on the storage means 9 of the digital integrated apparatus 10, and an user authentication means 11 performs the user authentication as described after by making reference to the user information table 9c.

After on the user setting screen the user ID is inputted into the user ID input column 41 and the password into the password input column 4m, the start button 4c is pressed. And then the information about the user ID and password is notified to the attribute information generating means 3 by the panel control means 4a. The attribute information generating means 3 generates a new attribute information by adding the information of user ID and password to the previous attribute information generated in the first embodiment (FIG. 7(a), Step 203→S204→S205).

The generated attribute information is registered into the storage means 9 together with the image data in the same way as the first embodiment. Therefore the registration processing is completed (FIG. 7(a), Step S206).

In the above description, a ten key 4e is adopted as a means of inputting an user ID, but it may be configured that the operation means 4 is provided with a magnetic card reader, which reads the magnetic card recorded the user ID.

Figure 12:
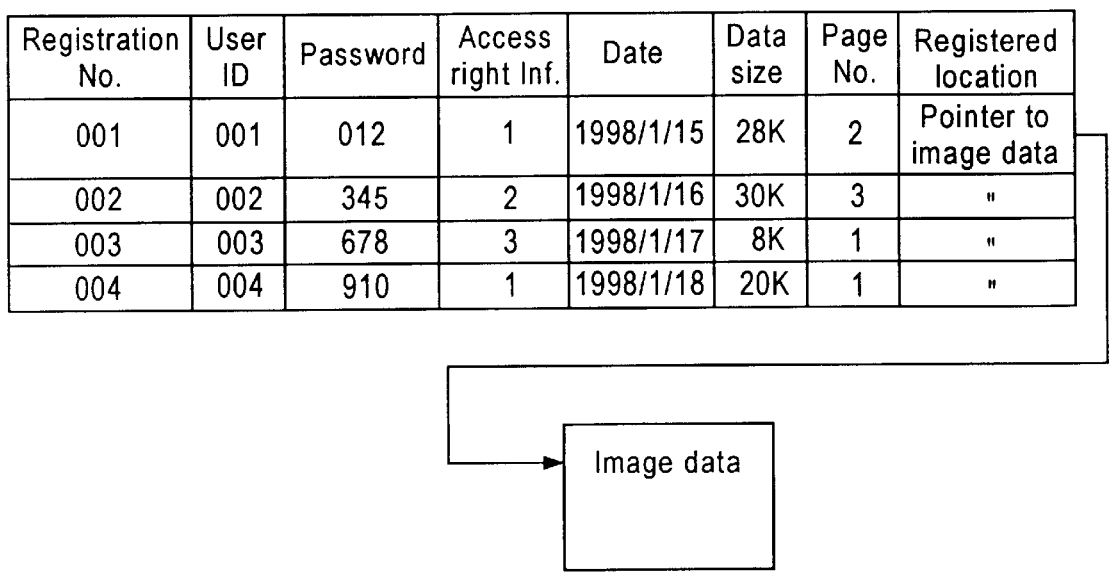
FIG. 12 shows an example of a configuration of the attribute information in the second embodiment of the present invention.

And the components of the attribute information table 9a is assumed that the previous attribute information table is added with the information of user ID and password as shown in FIG. 12, and same as that of the attribute information, (and "access right information" shown in FIG. 12 will be described later).

<Print Processing>

The print processing in this embodiment will be explained hereinafter.

First, in the way same as the first embodiment, the user starts the browser means 33, and then the connecting with the publication means 6 is successful. Thereby the initial screen shown in FIG. 18(a) is displayed on the display means 31. When the user clicks a "Press Here" button, the list view display screen shown in FIG. 18(c) is displayed (FIG. 7 (b), Step S207 to S211).

In this embodiment, the list view displayed as said list view display screen is added with "user ID" column in addition to the configuration described in the first embodiment. Accordingly, the user finds out the user ID allocated to himself as a mark so that the image data created by himself can be found out easily from the list view. The process from clicking the "print" column in the list view through printing the image data by the image data output means 1a in the digital integrated apparatus 10 is same as in the first embodiment FIG. 7(b), Step S212→S213).

The access right information are explained hereinafter.

The access right information are information to specify users who can gain access to the image data The configuration adopted this access right information is effective in the management of the image data In other word, at the time of registration processing the user selects and inputs from the touch panel 4d the information of the access requisites, that is, it is possible ① for only the registered user to print, ② for only members of group of registered user (which is defined in the user information table 9c beforehand) to print, ③ for anyone to print. And at the time of browsing, the user ID input screen shown in FIG. 18(f) is displayed before displaying the list view screen, and the user may input the user ID and password by the input means 32 such as keyboard in the browser unit 30. According to the construction described above, the publication means 6 can restrict the image data to be published through the user authentication means 11. (The user authentication means 11 makes reference to the user information table 9c according to the inputted information from the input means 32 and performs the user authentication)

(Embodiment 3)

Figure 3:
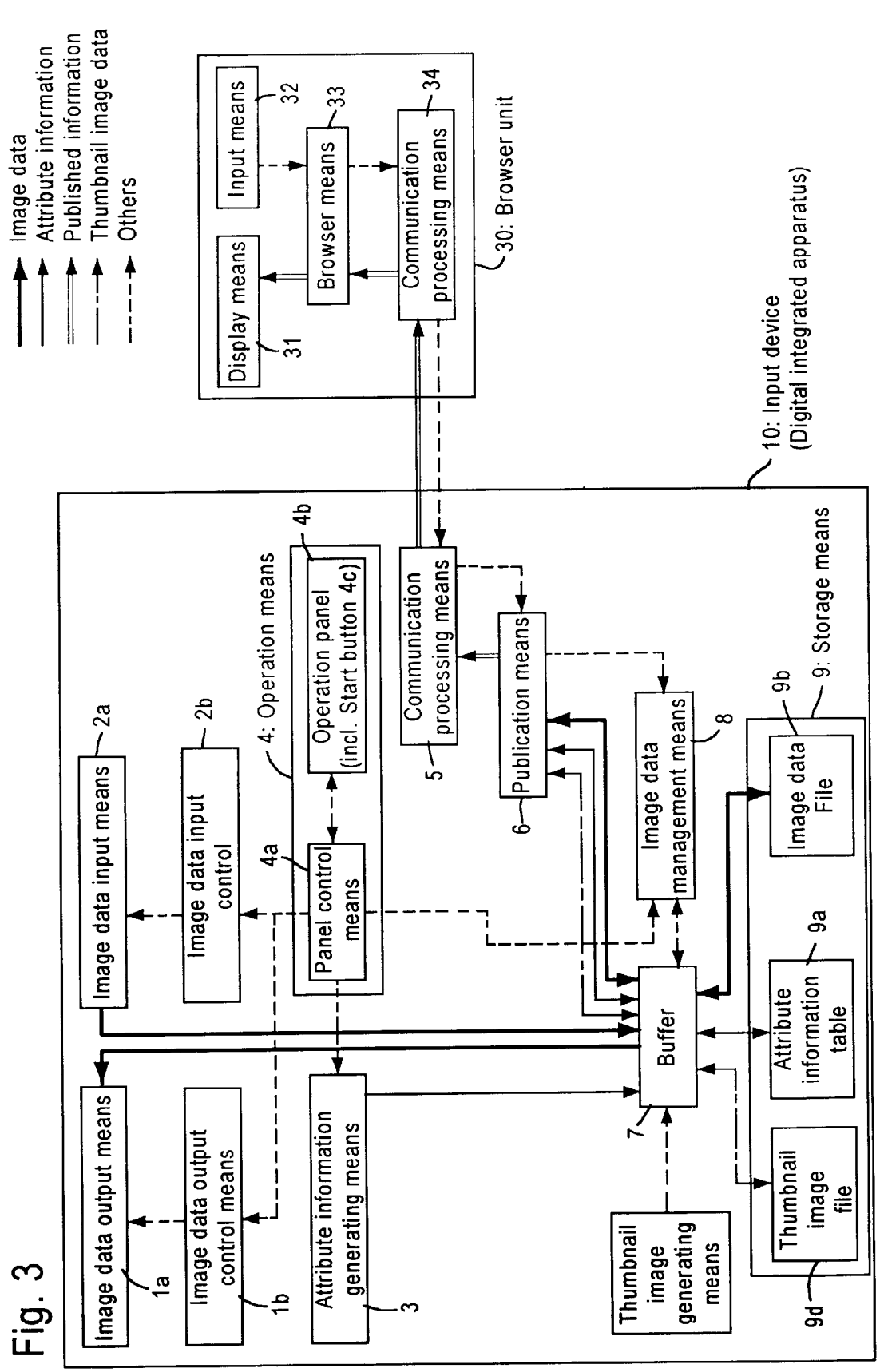
FIG. 3 shows a schematic functional block diagram in the third embodiment of the present invention.

In addition to the configuration described in the first or the second embodiment, it is configured in this embodiment that a thumbnail image of the image data is created in the side of the digital integrated apparatus 10, and said thumbnail image is added to the list view display screen. The points different from the first embodiment will be explained according to FIGS. 3 and 8.

<Registration Processing>

The user's operation of the digital integrated apparatus 10 in this embodiment is same as in the first embodiment. Namely, the user places manuscripts on the image data input means 2a and then presses the start button 4c including in the operation panel 4b FIG. 8(a), Step S301→S302→S303).

The process from generating the image data and the attribute information by the user's operation through storing them in the buffer 7 is same as in the first embodiment. But it is configured in this embodiment that a thumbnail image generating means 12 may generate a thumbnail image data of the image data stored in the buffer 7. Generally the resolution in the printing by a printer is about 400 dpi, but in this embodiment the resolution is to be from 25 to 50 dpi. therefore the image data shrinks to a size from one sixteenths ($1/16$) to one eighth ($1/8$). (FIG. 8(a), Step S304→S305→S306).

Figure 8A:
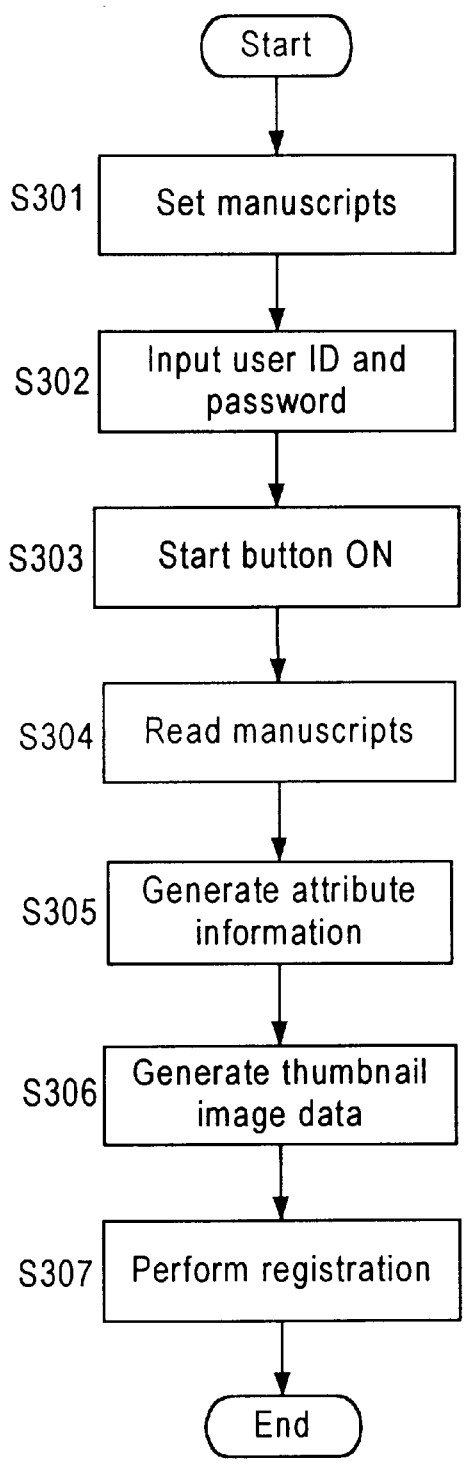
FIG. 8 shows a flowchart in the third embodiment of the present invention.
Figure 8B:
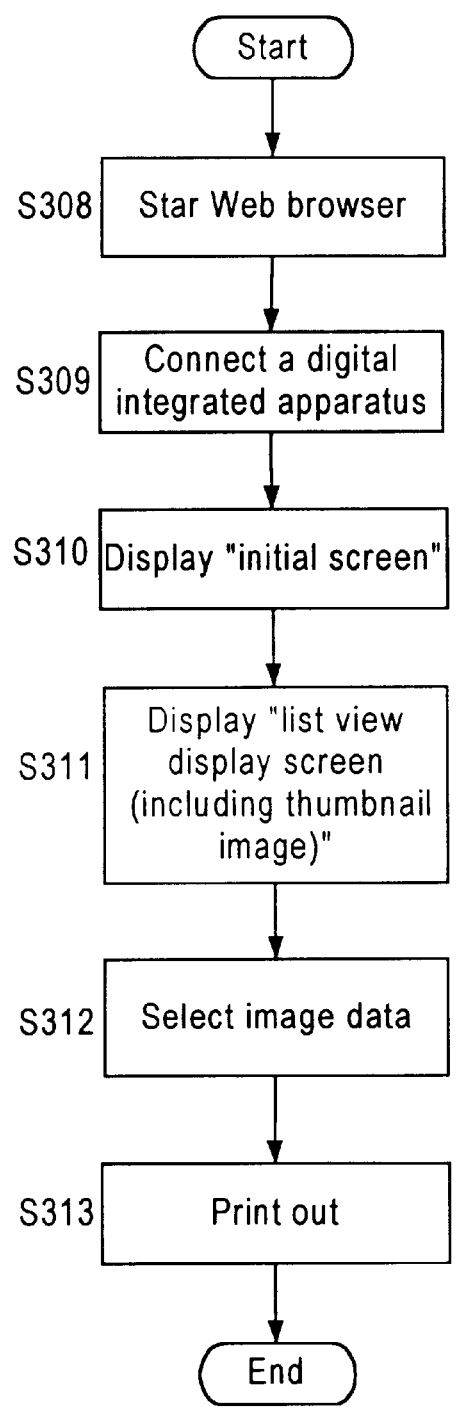

The thumbnail image data thus generated is registered in the storage means 9 as the thumbnail image file 9d by the image data management means 8, therefore the registration processing is completed (FIG. 8(a), Step S307).

And the attribute information table 9a in this embodiment is configured to be added with the pointer information to the above thumbnail image file 9d as shown in FIG. 13.

<Print Processing>

The thumbnail image shown in FIG. 18(d) is displayed on the list view display screen of the display means 31. Except it, the print processing is same as in the first embodiment. Namely, the publication means 6, which receives a request to obtain a list view from the browser means 33, creates a list view including the thumbnail image according to the information registered in the attribute information table 9a, and then transmits the list view information to the browser means 33. The data size of the thumbnail image is very little comparing with that of the original image data, and the transferable data size is little enough to be disregarded comparing with the image data (FIG. 8(b), Step S308 to S313).

(Embodiment 4)

Figure 4:
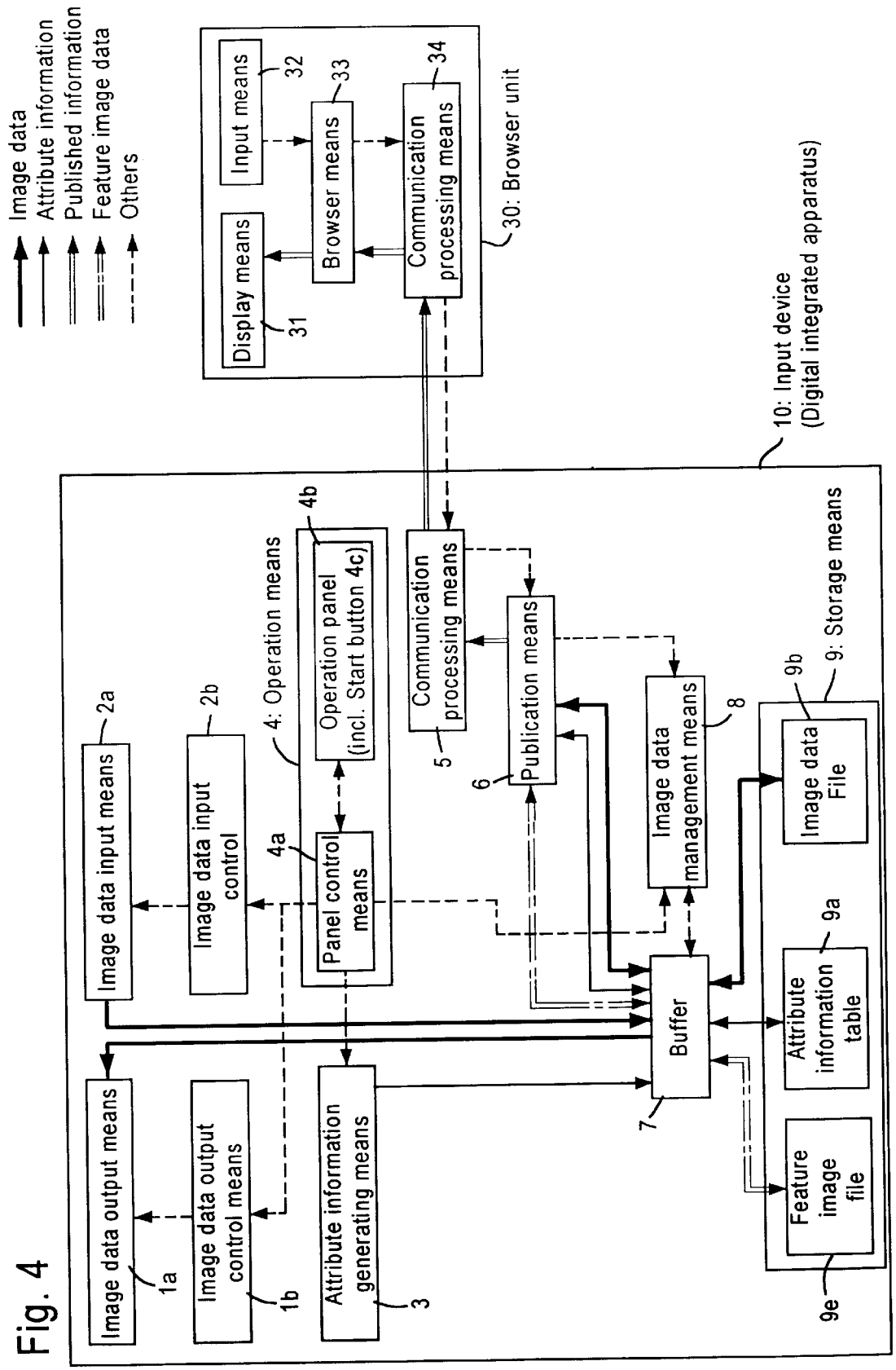
FIG. 4 shows a schematic functional block diagram in the fourth embodiment of the present invention.
Figure 9A:
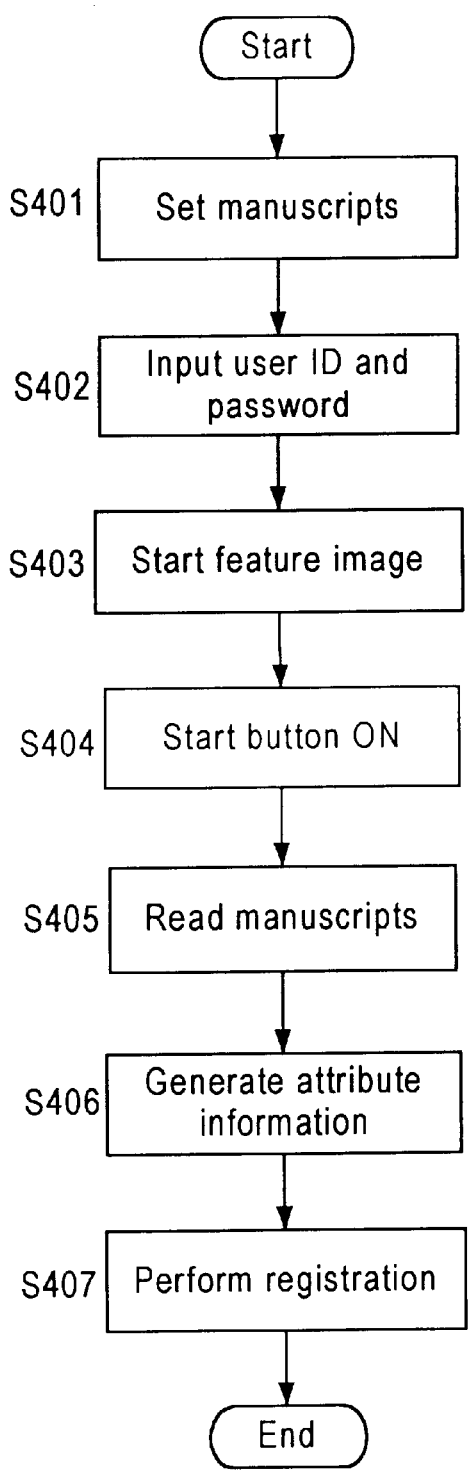
FIG. 9 shows a flowchart in the fourth embodiment of the present invention.
Figure 9B:
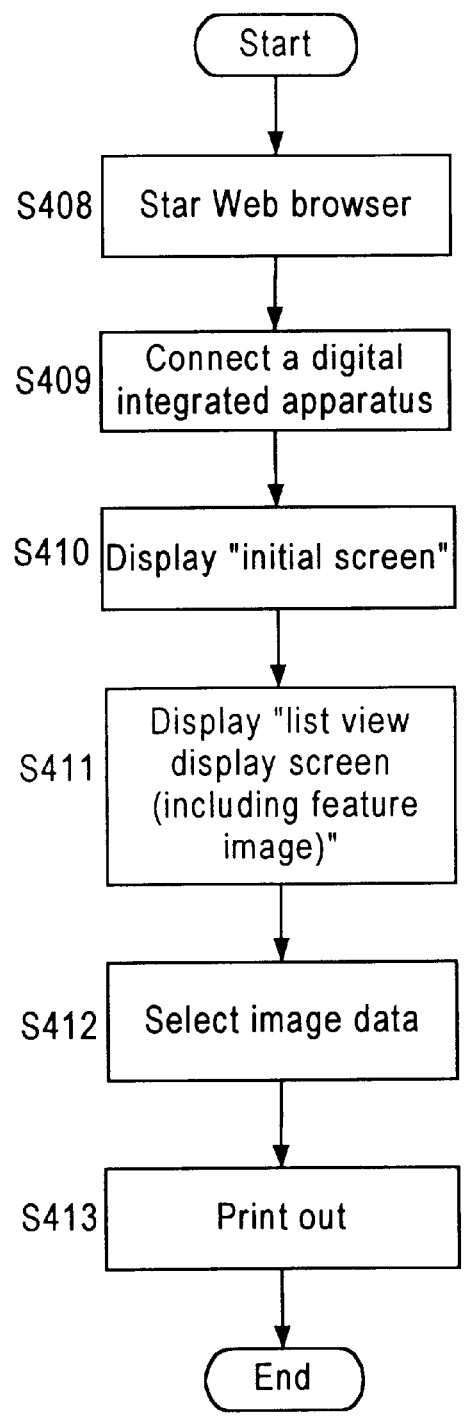

In addition to the either configuration described in the first, the second, or the third embodiment, it is configured in this embodiment that a feature image indicating the characteristic part of each image data is added to the list,view display screen at the time of browser processing The points different from the first embodiment will be explained according to FIGS. 4 and 9.

<Registration Processing>

Figure 17A:
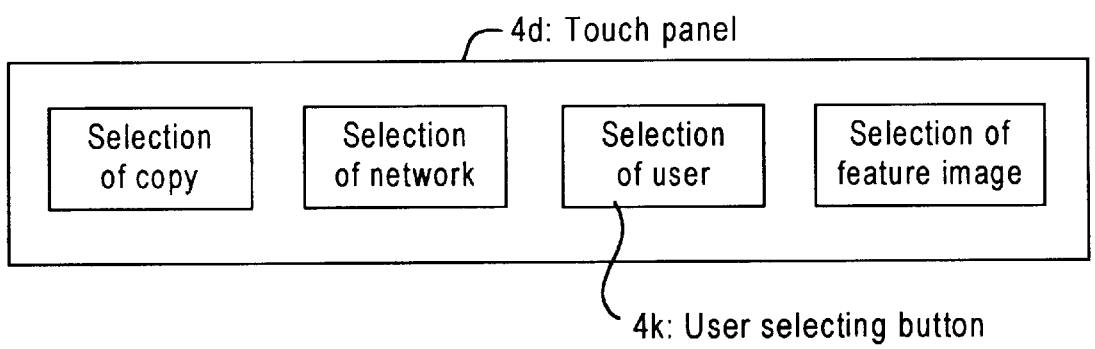
FIG. 17 shows an illustrated diagram of a touch panel in the fourth embodiment of the present invention.
Figure 17B:
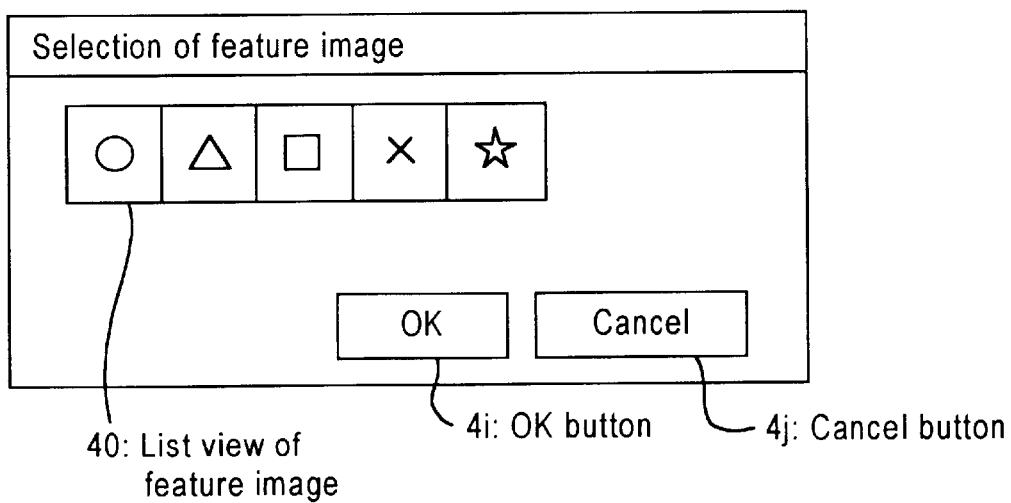

First, As the initial screen of the touch panel 4d displays a feature image setting button 4n shown in FIG. 17(a), before the step of pressing down the start button 4c after placing the manuscripts to be registered on the image data input means 2a, the user has to perform the the feature image setting described hereinafter. That is, the user presses down the "feature image setting" button 4n and selects an arbitrary feature image from the feature image list view 4o contained in the feature image setting screen shown in FIG. 17(b). After that, the user presses down "OK" button 4i (FIG. 9(a), Step S401→S402→S403).

Figure 14:
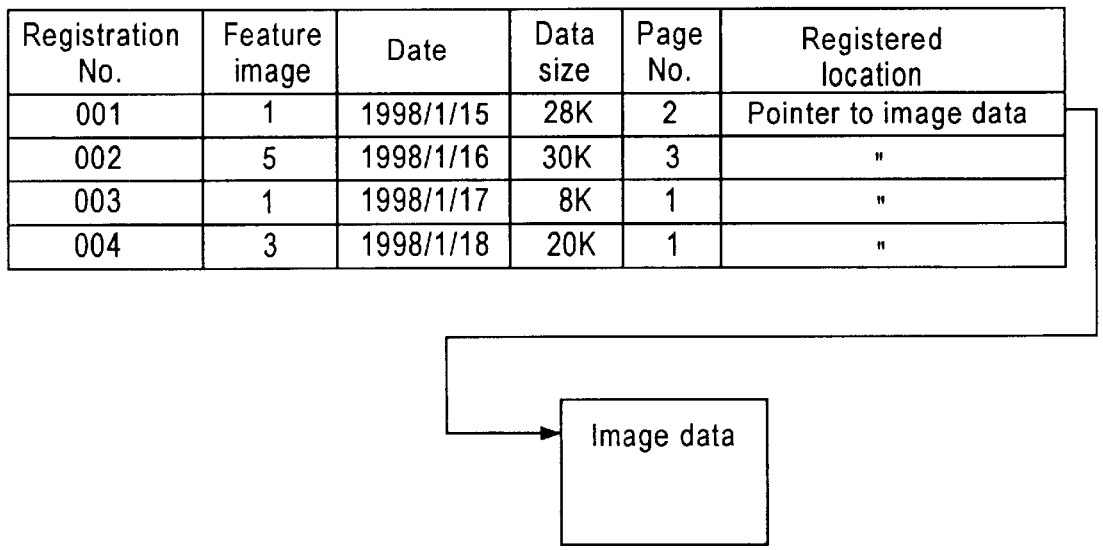
FIG. 14 shows an example of a configuration of the attribute information in the fourth embodiment of the present invention.
Figure 15:
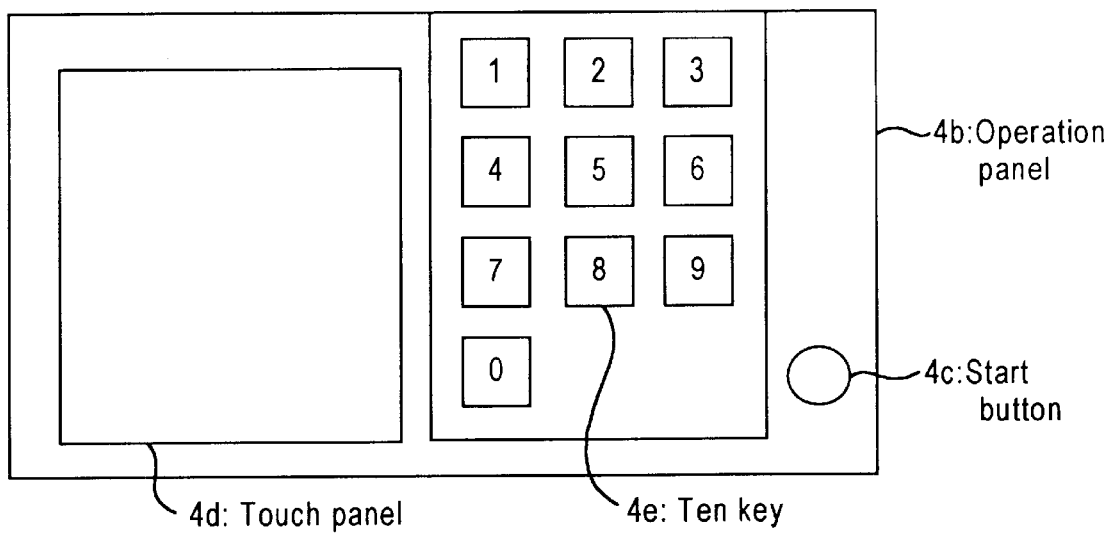
FIG. 15 shows an illustrated diagram of an operation panel.

After the above selection, if the start button 4c is pressed, the image data and the attribute information are generated same as in the first embodiment. The image data and attribute information thus generated are stored in the storage means 9. The attribute information in this embodiment is added with the feature image information corresponding to the selected feature image as shown in FIG. 14 (FIG. 9(a), Step S404→S405→S406→S407).

<Print Processing>

The storage means 9 of the digital integrated apparatus 10 in this embodiment has stored in advance the feature image file 9c corresponding to the feature image information. According to this setting a list view display screen displayed on the display means 31 of the browser unit 30 can display the feature images shown in FIG. 18(e), so that the user can find out easily the object image data from the list view (FIG. 9(b), Step S408 to S413).

The feature image in this embodiment is a specific image (a feature image file 9e stored in the storage means 9 in advance), but it is not limited to this. For example, it may be configured that a title is to be put in a specific position of the first page of manuscripts, and a digital integrated apparatus 10 is to be provided with a feature image extracting means (not shown) for cutting off a specific position of the image data, that is, a title position. And the image cut off by the feature image extracting means is to be treated as the feature image.

As described from the first to the fourth embodiment, the image data management system in the present invention can print out the image data registered in the storage means 9 of the digital integrated apparatus without transferring the image data and displaying the image data on a screen, so that it is possible to provide an image data management system which shorten the time of the print processing As the list view displayed on the browser unit 30 is to display so various information regarding the image data that the user can find out the image data to be printed easily.

And according to the above description, it is configured that the image data of the print-request object is printed out at once when the print-request is given from the browser means 33. But it may be configured that by adopting the security printing as follows, the timing of printing the image data may be controlled. Namely, the publication means 6 received the print-request from the browser means 33 transmits a screen data to the browser means 33, said screen data is for asking whether the security printing is performed or not. In case of receiving an instruction of the security printing from the browser means 33, the publication means 6 requests a receipt number issuing means (not shown) to issue a receipt number. The receipt number issuing means thus instructed issues a proper number (such as "1234", etc.) respectively for every image data of the print-request object in the digital integrated apparatus 10. The receipt number is notified to the user of the browser unit 30 through the publication means 6 and the browser means 33, and until the user inputs the receipt number from the operation panel 4b of the digital integrated apparatus 10, the image data output control means 1b of the digital integrated apparatus 10 waits for the printing of the image data corresponding to the receipt number. The above security printing by which the third person cannot see and read the printed matter, is effective when a plural user makes use of the image data management system The method of inputting the receipt number is to be executed not only from the key of the operation panel 4b by the user's operation but also from the recording medium such as a floppy disc, for example. It is also configured that the receipt number issuing means may issue the receipt number, but the means of issuing the receipt number is not restricted to this. For example, the publication means 6 which received the instruction of the security printing as described is to transmit the screen data for inputting the receipt number toward the browser means 33, and the information which the user input in the receipt number input screen is to be the receipt number, thereby the same effect is obtained as described above.

The above description is an example of the constitution that an unit of the browser unit 30 is connected with an unit of the digital integrated apparatus 10 through a network However, this invention can be applied to the configuration that a plural browser unit is connected with a plural digital integrated apparatus through a network According to this configuration, it is possible to shorten the time of the print processing further more by transferring the image data between the digital integrated apparatuses. In other words, the publication means 6 of the digital integrated apparatus 10, which receives the print-request from the browser means 33, if the image data output means 1a is in the state of busy (that is, is now executing the copying of large volume data), transmits to the browser means 33 a screen data for selecting a transfer destination (hereinafter called "transfer destination selecting screen") of the image data of the print-request object. When the user of the browser unit 30 selects the transfer destination information such as a network address of another digital integrated apparatus (not shown), for example, on the transfer destination selecting screen, the transfer destination information is given to the image data management means 8 through the publication means 6. The image data management means 8 fetches the image data corresponding to the registration number of the print-request object out of the storage means 9, and then transfers the image data toward the network address. If the image data thus transferred is printed out the image output means of said another digital integrated apparatus, the print processing is not interrupted by the state of busy, that is, it is not necessary for the print processing to standby till the image data output means 1a get to be available. It may be configured that the user ID and password, which are allocated at the transfer destination, is to be inputted in the transfer destination selecting screen, and thereby the user authentication may be performed in other digital integrated apparatus.

In the construction that a plural digital integrated apparatus is connected with network it is preferable that the server device should be equipped and centralize these plural digital integrated apparatus (for example, the attribute information should be controlled centrally in the sever device).

And in the above description there is an example shown the present invention with a network construction connected with LAN, but this invention is not limited to this. It may be configured that this invention is applied to a network construction connected with a public high-speed digital line or a wireless line such as a public telephone line and ISDN.

(Embodiment 5)

In the description from the first to the fourth embodiment, it is configured that by selecting the image data to be printed out of the list view the registration number is notified to the publication means 6. But it is configured in this embodiment that by using a marked cover sheet described after the registration number may be inputted from the input means 32 of the browser unit 30.

Figure 5:
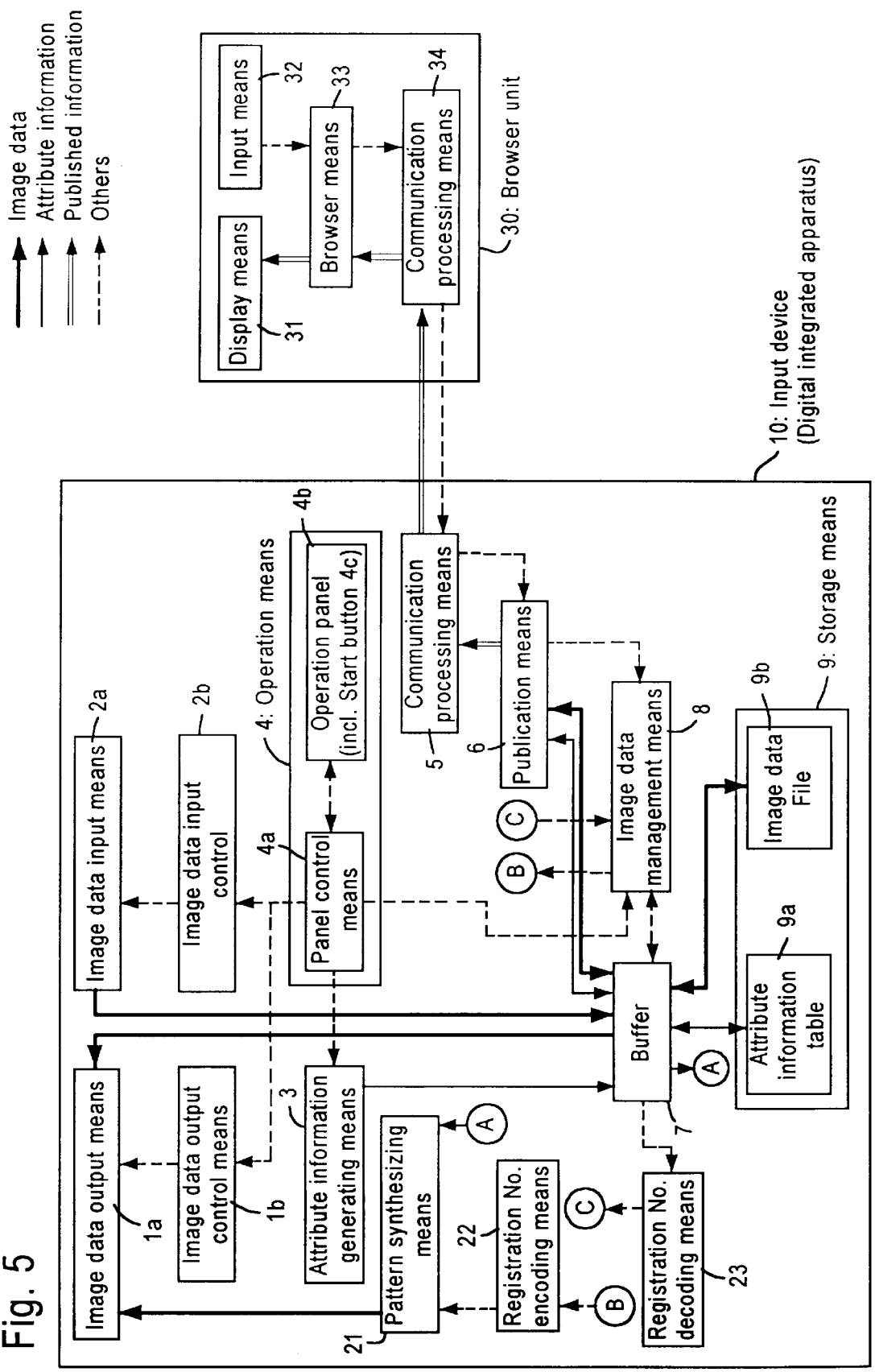
FIG. 5 shows a schematic functional block diagram in the fourth embodiment of the present invention.

The point different from the first embodiment regarding this embodiment will be explained according to FIGS. 5 and 10.

<Registration Processing>

The image data management means 8 received the print-request from the panel control means 4a, while registering the image data and the attribute information stored in the buffer 7 into the storage means 9 (FIG. 10(a), Step S501~S505), gives the registration number included in the attribute information table to the registration number encoding means 22. After the registration number encoding means 22 generates the registration number mark corresponding to the registration number, the registration number mark is given to the pattern synthesizing means 21. The pattern synthesizing means 21 received said mark synthesizes the registration number mark to a specific page (a front page or a page with a feature image) of the image data, and thereby generates the image data attached with the registration number mark (called a "marked cover sheet" hereinafter), which is transferred to the image data output means 1a. As a result, the marked cover sheet is printed by the image output means 1a (FIG. 10(a), Step S506).

<Print Processing>

By clicking the "press here" button shown in FIG. 18(a), the browser means 33 transmits a request to obtain screen toward the publication means 6. The publication means 6 received the request to obtain screen returns the registration number input screen (not shown back to the browser means 33 (FIG. 10(b), Step S507→S510).

And the registration number mark of the marked cover sheet generated in the above registration processing is read by the bar code reader (an input means 32), and then the registration number corresponding to the registration number mark is given to the browser means 33 (FIG. 10(b), Step S511).

Next, the browser means 33 transmits the print-request toward the publication means 6 together with the registration number thus received from the input means 32, and the publication means 6 received the print-request instructs the image data management means 8 to print the image data together with the registration number. The image data management means 8 instructed fetches the image data corresponding to the registration number out of the storage means 9, and then gives the image data to the image data output means 1a As a result, the original document corresponding to the marked cover sheet is printed out by the image data output means 1a (FIG. 10(b), Step S512).

As described above, it is configured in this embodiment that the registration number may be inputted from the input means 32. Accordingly, in case that the registration number of the image data to be printed is known in advance, the operation of creating and displaying the list view can be omitted.

In this embodiment the registration number is to be inputted by the bar code reader, but the method of inputting the registration number is not restricted to this. In case of the marked cover sheet, for example, the registration number which is printed together with the registration number mark is to be inputted from the keyboard, which is effective same as the above.

And in this embodiment, the registration number is to be inputted in the browser unit 30, but the marked cover sheet, which is inputted from the image data input means 2a of the digital integrated apparatus 10, is to be decoded by the registration number decoding means 23, therefore it is effective same as the above.

The example described in this embodiment is the marked cover sheet which is synthesized with the registration number mark and the front page of the image data, but instead of the front page the thumbnail image or the feature image can be synthesized with.

As described above, the image data stored in the storage means of the digital integrated apparatus can be printed out without transferring the image data and displaying the image data on the screen, so that it is possible to shorten the time of the print processing.

And the list view displayed on the browser unit is to display the thumbnail image and etc. so that the user can find out the image data to be printed from the list view.

What is claimed is:

1. In an image data management system, wherein an image data inputted from an image data input means is registered in a storage means with adding a registration identifier specifying said image data and then the registration identifier and attribute information about said image data corresponding to it are registered and controlled in an attribute information table, said image data management system comprising a digital integrated apparatus provided with a image data management means, when a specific registration identifier is informed, fetching the image data corresponding to said registration identifier and instructing an image data output means to print the fetched image data, and a plural browser unit connected with the digital integrated apparatus through a network, said digital integrated apparatus is provided with a publication means, which publishes a list view based on the attribute information registered in the attribute information table, notifying to the image data management means the registration identifier of a print-request object at receiving the print-request from the browser unit, said browser unit is provided with a browser means transmitting a print-request regarding an image data corresponding to at least one attribute information of the list view published by the publication means toward the publication means together with the registration identifier of the image data.

2. The image data management system defined in claim 1, wherein the attribute information contains unique user ID (identification) for every user.

3. The image data management system defined in claim 1, wherein the attribute information contains access right information about the image data.

4. The image data management system defined in claims 1, wherein the digital integrated apparatus is provided with a thumbnail image generating means generating a thumbnail image data of an image data, and the attribute information contains a pointer information indicating a registered location of the thumbnail image.

5. The image data management system defined in claim 1, wherein the attribute information contains feature image information about a specific feature of an image data.

6. The image data management system defined in claim 5, wherein the digital integrated apparatus is provided with a feature image extracting means extracting a data from a specific position of an image data, and said specific feature data is extracted by the feature image extracting means.

7. The image management system defined in claim 1, wherein the digital integrated apparatus is comprising:

a receipt identifier issuing means issuing a unique receipt identifier for every image data of a security-print-request object at receiving a security-print-request from the browser means and then notifying the receipt identifier to the publication means and the image data output means;

the publication means transmitting the receipt identifier from the receipt identifier issuing means toward the browser means; and an image data output management means, when the receipt identifier is inputted from an operation means, instructing the image data output means to print the image data corresponding to the receipt identifier.

8. The image data management system defined in claim 1, wherein the digital integrated apparatus is comprising:

the publication means, at receiving each unique receipt identifier of every image data of the security-print-request object together with the security-print-request from the browser means, informing the receipt identifier to the image data output control means; and the image data output control means, when the receipt identifier is inputted from the operation means, instructing the image data output means to print out the image data corresponding to the receipt identifier.

9. The image data management system defined in claim 1, wherein a plural digital integrated apparatus is connected with each other through a network, and wherein a specified digital integrated apparatus is comprising:

the publication means, when the print-request is received from the browser means, informing the browser means that the image data output means is busy; and the image data management means, when the browser means designates other specified digital integrated apparatus in response to the notification of the publication means, transmitting the image data corresponding to the registration number of the print-request object toward other specified digital integrated apparatus, and wherein other specified digital integrated apparatus is comprising the image data output means printing out the image data transmitted from the specific digital integrated apparatus.

10. An image data management method performed by a digital integrated apparatus wherein an image data inputted from an image data input means is registered in a storage means with adding a file name based on a registration identifier specifying said image data and then the registration identifier and attribute information about said image data corresponding to it are registered and controlled in an attribute information table, said method is comprising:

a step of publishing a list view based on the attribute information registered in the attribute information table;

a step of receiving the print-request of the image data corresponding to at least one attribute information of the list view thus published together with the registration identifier of the image data from the browser means connected through a network; and a step of fetching the image data corresponding to the received registration number of the print-request object from the storage means and printing it by the image data out means.

11. The image data management method defined in claim 10 is comprising;

a step of issuing when the security-print-request is received from the browser means, an unique receipt identifier for every image data of the security-print-request object;

a step of transmitting the issued receipt identifier to the browser means; and a step of printing the image data corresponding to the receipt identifier when the receipt identifier is inputted from the operation means.

12. The image data management method defined in claim 10, wherein a plural digital integrated apparatus is connected with each other through a network, said method is comprising:

a step that a specified digital integrated apparatus of which the image data out put means is busy receives the print-request from the browser means; and a step that the image data of the print-request object stored in the specified digital integrated apparatus is printed by the image data output means of the other specified digital integrated apparatus designated by the browser means.

13. A digital integrated apparatus configured to print out specific image data upon receipt of a print-request for the specific image data sent from a browser means connected with the digital integrated apparatus via internet, comprising:

image data management means for managing image data stored in a storage means by registering a registration ID specifying image data and attribute information in an attribute information table, and in response to a selection of a specific registration ID, retrieving and printing image data corresponding to the selected registration ID from a storage means; and publication means for publishing a list based on the attribute information in the attribute information table, and in response to the print-request from the browser means notifying the image data management means of the registration ID of the object of the print-request.

14. The digital integrated apparatus defined in claim 13, wherein the attribute information comprises unique user IDs for every user.

15. The digital integrated apparatus defined in claim 13, wherein the attribute information comprises access right information for the image data.

16. The digital integrated apparatus defined in claim 13, wherein the server is provided with thumbnail image generating means for generating a thumbnail image from image data, and the attribute information contains pointer information indicating a registered location of the thumbnail image.

17. The digital integrated apparatus defined in claim 13, wherein the attribute information comprises feature image information about a specific feature image data.

18. The digital integrated apparatus defined in claim 17, comprising feature image extracting means for extracting data from a specific position of image data, said specific feature data extracted by the feature image extracting means.

19. The digital integrated apparatus defined in claim 13, further comprising:

receipt number issuing means for issuing a unique receipt number for image data that is the object of a security-print-request upon receipt of a security-print-request from the browser means and for providing the receipt number to said publication means and to an image data output means; and image data output control means for instructing the image data output means to print the image data corresponding to the receipt number when the receipt number is input into the image data management means from an operation means, wherein said publication means is configured to transmit said receipt number to the browser means.

20. The digital integrated apparatus defined in claim 13, further comprising:

image data control means for instructing the image data output means to print the image data corresponding to the receipt number when the receipt number is input into the image data management means from an operation means, wherein said publication means, upon receipt of security-print-request, requests unique receipt numbers for respective image data and notifies the image data output control means of the receipt number of the image data.

21. A storage medium storing a computer program readable and executed by a digital integrated apparatus that manages image data stored in the storage means by registration ID and attribute information for specifying the image data in an attribute information table and on the basis of an instruction sent from browser means, the program comprising the steps of:

publishing a list based on attribute information registered in the attribute information table;

receiving together a registration ID of the image data and the print-request of image data corresponding to at least one piece of attribute information of said list from the browser means connected through a network; and retrieving the image data corresponding to the received registration ID of the print-request from the storage means and printing the data by the image data output means.

22. A storage medium defined in claim 21, further comprising the steps of:

issuing, when the security-print-request is received from the browser means, an unique receipt ID for every image data of the object of the security-print-request;

transmitting the issued receipt ID to the browser means; and printing the image data corresponding to the receipt ID when the receipt ID is input from the operation means.

23. A storage media defined in claim 21 storing an image management program of a plural digital integrated apparatuses connected with each other through a network, said program comprising the steps of:

receiving a print request from the browser means by a specified digital integrated apparatus wherein the image data output means is busy; and printing the image data of the object of the print-request stored in the storage means in the specific digital integrated apparatus by the image output means of another digital integrated apparatus specified by the browser means.

* * * * *

UNITED STATES PATENT AND TRADEMARK OFFICE
CERTIFICATE OF CORRECTION

PATENT NO.     : 6,515,765 B1
DATED          : February 4, 2003
INVENTOR(S)    : Akito Umebayashi It is certified that error appears in the above-identified patent and that said Letters Patent is hereby corrected as shown below:

Column 11,
Line 43, change "claims" to -- claim --

Column 13,
Line 6, change "out put means" to -- output means --

Signed and Sealed this

First Day of July, 2003

JAMES E. ROGAN
*Director of the United States Patent and Trademark Office*